(12) United States Patent
Yang et al.

(10) Patent No.: US 10,670,866 B2
(45) Date of Patent: Jun. 2, 2020

(54) METHOD FOR PROVIDING COMPOSITE IMAGE BASED ON OPTICAL TRANSPARENCY AND APPARATUS USING THE SAME

(71) Applicant: ELECTRONICS AND TELECOMMUNICATIONS RESEARCH INSTITUTE, Daejeon (KR)

(72) Inventors: Ung-Yeon Yang, Daejeon (KR); Ki-Hong Kim, Sejong (KR); Jin-Ho Kim, Daejeon (KR)

(73) Assignee: ELECTRONICS AND TELECOMMUNICATIONS RESEARCH INSITUTE, Daejeon (KR)

( * ) Notice: Subject to any disclaimer, the term of this patent is extended or adjusted under 35 U.S.C. 154(b) by 0 days.

(21) Appl. No.: 16/001,625

(22) Filed: Jun. 6, 2018

(65) Prior Publication Data
US 2018/0356638 A1 Dec. 13, 2018

(30) Foreign Application Priority Data
Jun. 13, 2017 (KR) .................. 10-2017-0073944

(51) Int. Cl.
*H04N 7/18* (2006.01)
*G02B 27/01* (2006.01)
(Continued)

(52) U.S. Cl.
CPC ....... *G02B 27/0172* (2013.01); *G02B 3/0006* (2013.01); *G02B 27/0093* (2013.01);
(Continued)

(58) Field of Classification Search
CPC ............ G02B 27/0172; G02B 27/0093; G02B 27/0101; G02B 2027/0138;
(Continued)

(56) References Cited

U.S. PATENT DOCUMENTS 9,075,563 B2  7/2015 Kim
9,759,913 B2  9/2017 Saarikko et al.
(Continued)

FOREIGN PATENT DOCUMENTS

KR  20150026455  3/2015
KR  20160055174  5/2016
KR  20160102481  8/2016

OTHER PUBLICATIONS

Maimone, et al., "Pinlight Displays: Wide Field of View Augmented Reality Eyeglasses Using Defocused Point Light Sources," ACM Transactions on Graphics (TOG), 2014, vol. 33 (4), Article 89, pp. 11.

*Primary Examiner* — Sath V Perungavoor
*Assistant Examiner* — Peet Dhillon

(57) ABSTRACT

Disclosed herein are a method for providing a composite image based on optical transparency and an apparatus for the same. The method includes supplying first light of a first light source for projecting a virtual image and second light of a second light source for tracking eye gaze of a user to multiple point lights based on an optical waveguide; adjusting the degree of light concentration of any one of the first light and the second light based on a micro-lens array and outputting the first light or the second light, of which the degree of light concentration is adjusted; tracking the eye gaze of the user by collecting the second light reflected from the pupil of the user based on the optical waveguide; and combining an external image with the virtual image based on the tracked eye gaze and providing the combined image to the user.

20 Claims, 20 Drawing Sheets

(51) Int. Cl.
*G02B 27/00* (2006.01)
*G06F 3/01* (2006.01)
*G06F 3/147* (2006.01)
*G06F 1/16* (2006.01)
*G02B 3/00* (2006.01)

(52) U.S. Cl.
CPC ....... *G02B 27/0101* (2013.01); *G02B 27/017* (2013.01); *G06F 1/163* (2013.01); *G06F 3/011* (2013.01); *G06F 3/013* (2013.01); *G06F 3/147* (2013.01); *G02B 2027/0118* (2013.01); *G02B 2027/0138* (2013.01); *G02B 2027/0178* (2013.01); *G02B 2027/0187* (2013.01); *G09G 2320/0261* (2013.01); *G09G 2340/12* (2013.01)

(58) Field of Classification Search
CPC . G02B 2027/0178; G06F 1/163; G06F 3/013; G06F 3/147
USPC .......................................................... 348/78
See application file for complete search history.

(56) References Cited

U.S. PATENT DOCUMENTS

| | | |
|---|---|---|
| 9,785,306 B2 | 10/2017 | Yang et al. |
| 2014/0176814 A1 | 6/2014 | Ahn |
| 2015/0035744 A1* | 2/2015 | Robbins ............... G02B 27/017 345/156 |
| 2015/0234205 A1* | 8/2015 | Schowengerdt ......... G02B 6/40 351/159.02 |
| 2016/0202484 A1 | 7/2016 | Ouderkirk |
| 2017/0069612 A1* | 3/2017 | Zhang .................. G03B 21/005 |
| 2019/0025645 A1* | 1/2019 | Aieta .................. G02B 6/0035 |

* cited by examiner

//METHOD FOR PROVIDING COMPOSITE IMAGE BASED ON OPTICAL TRANSPARENCY AND APPARATUS USING THE SAME

CROSS REFERENCE TO RELATED APPLICATION

This application claims the benefit of Korean Patent Application No. 10-2017-0073944, filed Jun. 13, 2017, which is hereby incorporated by reference in its entirety into this application.

BACKGROUND OF THE INVENTION

1. Technical Field

The present invention relates generally to technology for providing a composite image based on optical transparency, and more particularly to a method for providing a composite image based on optical transparency, in which, using a light and small device like eyeglasses, a virtual image that fills a user's field of view may be provided along with see-through vision to the real world without blocking a view of an external environment, and an apparatus for the same.

2. Description of the Related Art

Generally, 3D display techniques are largely categorized into the following three types. The first one is a method for artificially implementing a natural phenomenon in which light emitted from a light source (e.g. the sun) is reflected from a surface having a certain shape, and the reflected light, having a specific wavelength (color), is directed to the eyes of an observer, for example, like an ideal holographic display. The second one is a method for generating and displaying two images that artificially implement binocular disparity, which is the difference between images input to the left and right eyes, among the characteristics of human visual 3D recognition. The final one is a method for implementing an effect similar to the effect of the first method by delivering multiple viewpoints to the user's eyes based on the second method.

As described above, the conventional methods for implementing 3D stereoscopic images may not realize an optical see-through capability, which enables users to freely see their surroundings as though looking through eyeglasses.

Most lightweight Head Mounted Displays (HMDs) for supporting an optical see-through capability, introduced for customers in the market, have a narrow viewing angle that ranges from about 30 to 40 degrees. According to a case study report, the maximum viewing angle of an optical see-through wearable display having an external form as light as eyeglasses is only 56 degrees, as described in the thesis titled "Wearable display for visualization of 3D objects at your fingertips" (written by Ungyeon Yang and Ki-Hong Kim and published in SIGGRAPH' 14 ACM SIGGRAPH 2014 Posters).

Also, like the iOptik system developed by INNOVEGA, the method of placing a high-resolution micromini display panel very close to the eyes has been proposed as a method for implementing a wearable display as light as eyeglasses, but this method is problematic in that it is inconvenient because a user must wear a special contact lens.

Also, as proposed in a thesis titled "Pinlight displays: wide field of view augmented reality eyeglasses using defocused point light sources" (written by Andrew Maimone, Douglas Lanman, Kishore Rathinavel, Kurtis Keller, David Luebke, and Henry Fuchs and published in ACM Transactions on Graphics (TOG)—Proceedings of ACM SIGGRAPH 2014 TOG Homepage archive, Volume 33 Issue 4), the existing method for implementing a display in the form of light eyeglasses is not satisfactory for use in commercial products for customers because of multiple disadvantages, such as nonuniformity of a light source of a backlight panel configured with point light sources, low quality of a provided image due to an incomplete eye-tracking function, and the like.

According to the conventional method, a panel for creating multiple point light sources called "pinlights" is formed by etching patterns at regular distances (by cutting grooves using a robot arm of a 3D printer) on an acrylic sheet, and a backlight panel is implemented in such a way that, when light incident from edge-lit LEDs meets an etched divot while travelling after being totally internally reflected, the light is emitted outside the acrylic sheet via the point-type light. That is, the conventional method employs some backlight implementation methods commonly used in the technical field for implementing a flat display panel, for example, an edge-lit screen, a lightguide, and the like.

Therefore, the conventional method is disadvantageous in that it is difficult to implement point light sources having equal brightness (the same amount of light) at all positions in a pinlight panel. Also, respective light rays emitted by multiple point light sources may have different brightness and wavelengths. When a display panel for a TV is manufactured, the corresponding problem may be solved by additionally applying a diffusion film for evenly diffusing light in between the front point light source unit and a color pixel panel (e.g., an RGB panel). However, this method is merely for acquiring the effect of evenly emitting light from all parts of a flat panel, but is not suitable for an optical see-through wearable display because transparency (a see-through effect) for penetrating a real (virtual) image outside the image panel is obstructed. In connection with this, Korean Patent Application Publication No. 10-2015-0026455 discloses a technology related to "Apparatus and method for designing display for user interaction in the near-body space".

SUMMARY OF THE INVENTION

An object of the present invention is to provide technology for a wearable display that is capable of providing image information filling a user's field of view based on optical transparency using a light and small module resembling general eyeglasses.

Another object of the present invention is to improve the visual quality, such as contrast, color quality, intensity, focus alignment, and the like, of an image output via an eyeglasses-type display by providing technology for controlling energy emission by each point light source, which may overcome the limitation of a pin-light array.

A further object of the present invention is to provide an eye-tracking module with a minimum volume that may be embedded in an eyeglasses-type display and that may track the pattern of movement of an eye located in front thereof or off to one side.

In order to accomplish the above objects, a method for providing a composite image based on optical transparency according to the present invention includes supplying first light of a first light source for projecting a virtual image and second light of a second light source for tracking eye gaze of a user to multiple point lights based on an optical waveguide having a bidirectional propagation characteristic; adjusting a degree of light concentration of any one of the first light and the second light based on a micro-lens array and outputting the first light or the second light, of which the degree of light concentration is adjusted; collecting the second light reflected from a pupil of the user based on the optical waveguide and thereby tracking the eye gaze of the user; and combining an external image with the virtual image based on the tracked eye gaze and providing the combined image to the user.

Here, a transparent backlight panel including the optical waveguide, the micro-lens array, and a transparent image display panel for generating the virtual image may be included in a transparent panel of a wearable display, which is located directly in front of the pupil of the user.

Here, supplying the first light and the second light may be configured to individually control an intensity of the first light supplied to each of the multiple point lights by adjusting diameters of some of multiple paths corresponding to the optical waveguide.

Here, supplying the first light and the second light may be configured to individually control a characteristic of the first light supplied to each of the multiple point lights based on a multiple-layer structure using multiple transparent backlight panels.

Here, the micro-lens array may be configured with multiple lenses, thicknesses of which are controllable in real time.

Here, the multiple lenses may be individually controlled based on a control signal for each of multiple groups generated based on the multiple lenses.

Here, the method may further include calibrating a focus of a composite image projected onto the pupil of the user using an additional micro-lens array located between the image display panel and the pupil of the user.

Here, the transparent panel may be in a form of a flat surface or a curved surface.

Here, outputting the first light or the second light, of which the degree of light concentration is adjusted, may include performing, by the micro-lens array, at least one of a convergence function and a divergence function, thereby adjusting the degree of light concentration such that the first light has a same property as natural light; and performing, by the micro-lens array, at least one of the convergence function and the divergence function, thereby adjusting the degree of light concentration such that a transmissivity with which the second light penetrates through the image display panel is increased and such that a collection rate at which the second light reflected from the pupil of the user is collected is increased.

Here, outputting the first light or the second light, of which the degree of light concentration is adjusted, may include deactivating a lens, a refractive index of which exceeds a user recognition level, among the multiple lenses.

Here, tracking the eye gaze of the user may be configured to collect the reflected second light using an end part of the optical waveguide that is extended so as to be closer to the pupil of the user.

Also, a wearable display based on optical transparency according to an embodiment of the present invention includes a transparent backlight panel for supplying first light of a first light source for projecting a virtual image, which is to be combined with an external image, and second light of a second light source for tracking an eye gaze of a user to multiple point lights based on an optical waveguide having a bidirectional propagation characteristic; a micro-lens array for adjusting a degree of light concentration of the first light and the second light; an eye-tracking module for tracking the eye gaze of the user by collecting the second light reflected from a pupil of the user based on the optical waveguide; and an image display panel for displaying the virtual image.

Here, the transparent backlight panel, the micro-lens array, and the image display panel may be included in a transparent panel located directly in front of the pupil of the user.

Here, the transparent backlight panel may individually control an intensity of the first light supplied to each of the multiple point lights by adjusting diameters of some of multiple paths corresponding to the optical waveguide.

Here, a characteristic of the first light supplied to each of the multiple point lights may be individually controlled based on a multiple-layer structure using multiple transparent backlight panels.

Here, the micro-lens array may be configured with multiple lenses, thicknesses of which are controllable in real time.

Here, the multiple lenses may be individually controlled based on a control signal for each of multiple groups generated based on the multiple lenses.

Here, the transparent panel may further include an additional micro-lens array, located between the image display panel and the pupil of the user, for calibrating a focus of a composite image to be projected onto the pupil of the user.

Here, the transparent panel may be in a form of a flat surface or a curved surface.

Here, the micro-lens array may adjust the degree of light concentration such that the first light has same properties as natural light by performing at least one of a convergence function and a divergence function, and may adjust the degree of light concentration so as to improve a transmissivity, with which the second light penetrates through the image display panel, and to improve a collection rate, at which the second light reflected from the pupil of the user is collected, by performing at least one of the convergence function and the divergence function.

Here, the micro-lens array may deactivate a lens, a refractive index of which exceeds a user recognition level, among the multiple lenses.

Here, the eye-tracking module may collect the reflected second light using an end part of the optical waveguide extended so as to be closer to the pupil of the user.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
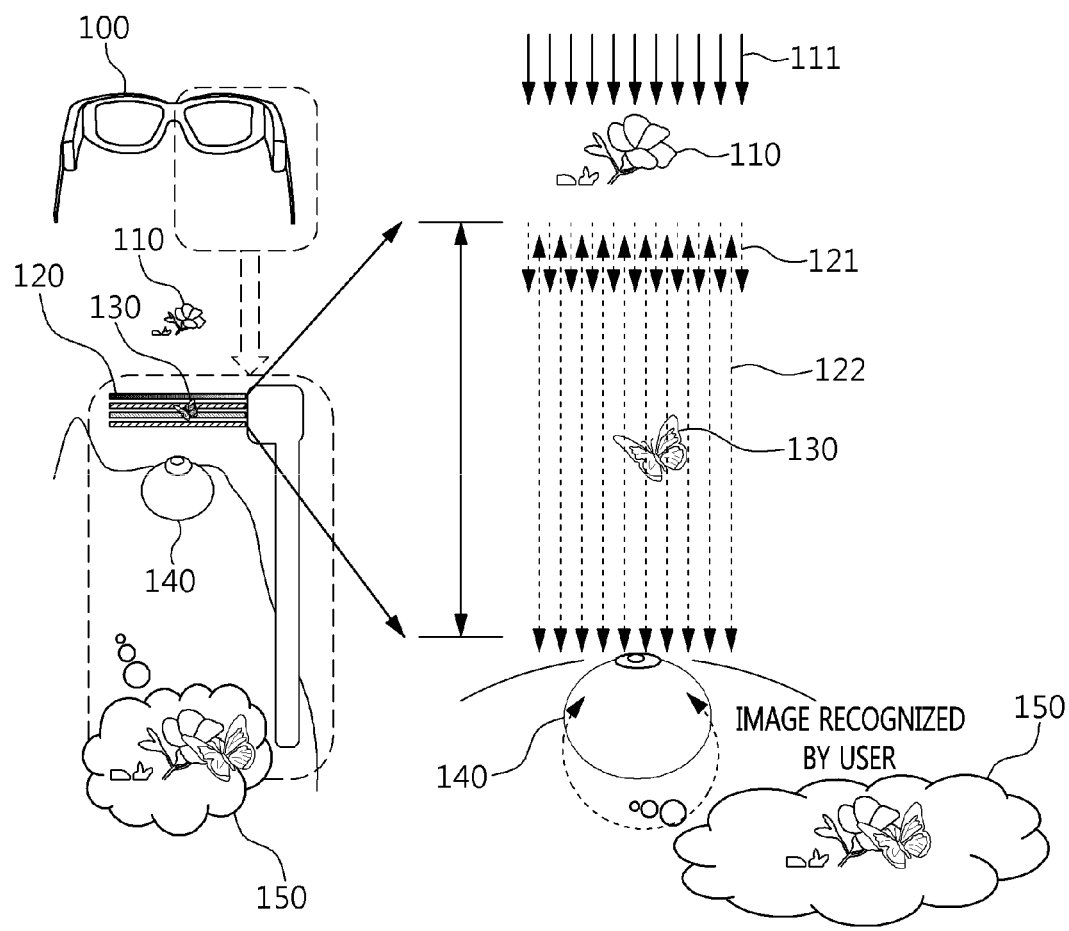
FIG. 1 is a view that shows the process of providing a composite image using a wearable display based on optical transparency according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated in order to make the description clearer.

Hereinafter, a preferred embodiment of the present invention will be described in detail with reference to the accompanying drawings.

FIG. 1 is a view that shows the process of providing a composite image using a wearable display based on optical transparency according to an embodiment of the present invention.

Referring to FIG. 1, a wearable display 100 based on optical transparency according to an embodiment of the present invention provides a composite image 150, acquired by combining an external image 110 visible in an external environment with a virtual image 130, toward a pupil 140 of a user, thereby showing the user the virtual image 130 naturally superimposed over the real world. That is, FIG. 1 shows an example in which the image of a flying butterfly is combined with the image of a flower and is provided to the user, in which case the virtual image 130, corresponding to the flying butterfly, may be provided by being output via the inner surface of the transparent panel 120 of the wearable display 100, which is placed directly in front of the pupil 140 of the user.

The main components of the above-described lightweight wearable display 100, which is capable of providing a natural composite image, may include a transparent backlight module for supplying light by being configured with an array of point lights based on an optical waveguide, an eye-tracking module for tracking the eye gaze of the user who wears the wearable display by being included in the transparent panel based on the optical waveguide, an image display panel for displaying a virtual image provided only to the user who wears the wearable display, and a micro-lens array for controlling the degree of concentration of light emitted from the multiple point lights.

Here, commonly used infrared rays may be used to track the eye gaze of a user, but without limitation to a specific wavelength, any wavelength that is harmless to the human body and available for eye tracking may be used.

Here, the example illustrated on the right side of FIG. 1 shows that a user recognizes the result of a combination of the virtual image 130, which is the image of a flying butterfly, with the external image 110, which is the image of a flower, as a single image, like the composite image 150.

Here, the external image 110 may be a real object in the real world or an image or video output via another arbitrary display, and the virtual image 130 may be an image made visible only in the image display panel of the wearable display 100.

Here, the external image 110 may be projected onto a pupil 140 of a user through natural light 111, and the virtual image 130 may be projected onto the pupil 140 of the user through visible rays 121 generated in the transparent backlight panel.

Here, the transparent backlight panel may output infrared rays 122 for tracking the eye gaze of a user along with the visible rays 121 for projecting the virtual image 130. The infrared rays reflected from a pupil 140 of the user may be collected and used for tracking the eye gaze of the user.

Here, the light for tracking the eye gaze of a user is not limited to infrared rays, and any light having a wavelength that is capable of eye tracking but is harmless to the human body may be used.

The wearable display 100 according to an embodiment of the present invention may be an optical system that uses the characteristics of a pinhole camera model based on multiple point lights in order to enable a user to clearly show the image provided by a panel located directly in front of an eye of the user. Here, the distance from a pupil 140 of the user to the transparent panel 120 of the wearable display 100 may be assumed to be about 2 to 3 cm.

Realization of a transparent backlight panel including a point-light array based on an optical waveguide, which is a core element of the present invention, may be assured through the adoption of a fabrication method through which an optical waveguide can be formed inside a thin transparent element such as a flexible film. Also, realization of an eye-tracking module using an optical waveguide may be assured through the method of forming a fixed micro-lens array or a deformable lens based on a flexible transparent material such as a polymer.

Figure 2:
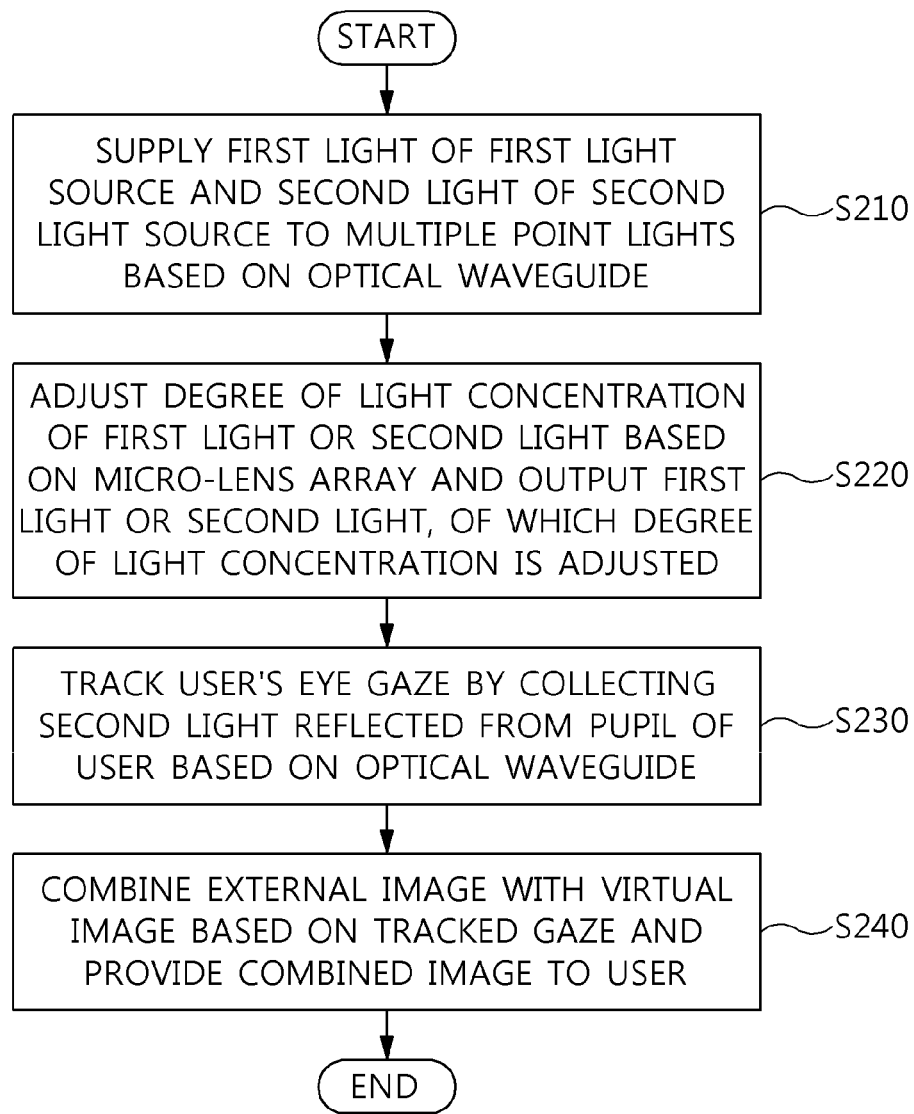
FIG. 2 is a flowchart that shows a method for providing a composite image based on optical transparency according to an embodiment of the present invention.

FIG. 2 is a flowchart that shows a method for providing a composite image based on optical transparency according to an embodiment of the present invention.

Referring to FIG. 2, in the method for providing a composite image based on optical transparency according to an embodiment of the present invention, first light of a first light source for projecting a virtual image and second light of a second light source for tracking the eye gaze of a user are supplied to multiple point lights based on an optical waveguide having a bidirectional propagation characteristic at step S210.

Here, the first light is not randomly reflected, but is supplied only along a previously designed optical waveguide path, whereby the problem in which light cannot maintain an equal brightness and wavelength by being totally internally reflected and scattered when the existing point light source pattern is used may be solved.

For example, the optical waveguide may be designed and manufactured using the method of designing and manufacturing an Integrated Circuit (IC) board or a press-printing method for forming multiple layers. This manufacturing method is commonly used in optical communications fields or semiconductor fabrication fields, but may also be used to solve the problems resulting from forming the pattern of point lights in the field of a wearable display that is capable of providing a composite image, as in the present invention.

Here, the first light may be visible rays for showing a virtual image generated in a wearable display to a user by projecting the same.

Here, the intensity of the first light supplied to each of the multiple point lights may be individually controlled by adjusting the diameters of some of multiple paths corresponding to the optical waveguide.

For example, the optical waveguide may be designed such that the first light is individually directed to all of the point lights using multiple first light sources.

Alternatively, the optical waveguide may be designed such that the first light supplied from a small number of first light sources is directed to all of the point lights using a branch method.

Accordingly, the transparent backlight panel of the wearable display may be advantageous in that point lights may be implemented such that light for all of the point lights has the same properties or in that the point lights may be implemented so as to have different patterns depending on the purpose thereof. That is, the transparent backlight panel according to the present invention may be used as a panel for displaying an arbitrary video image when the concept of a unit pixel in a general image panel is applied thereto.

Here, the characteristics of the first light supplied to each of the multiple point lights may be individually controlled based on a multiple-layer structure using multiple transparent backlight panels.

The multiple-layer structure will be described in detail with reference to FIGS. 3 to 6.

Here, the second light for tracking the eye gaze of the user who wears the wearable display may have a wavelength that is harmless to the human body and available for eye tracking. That is, the second light may not be limited to light having a specific wavelength, such as infrared rays.

Here, the second light may be projected using the point lights that project the first light, among the multiple point lights, or may be projected using point lights other than the point lights that project the first light, among the multiple point lights.

That is, a single point light may project both the first light and the second light, and a point light for projecting the first light may be separate from that for projecting the second light.

Also, in the method for providing a composite image based on optical transparency according to an embodiment of the present invention, the degree of light concentration of any one of the first light and the second light is adjusted based on a micro-lens array, and the light, of which the degree of light concentration is adjusted, is output at step S220.

Here, the micro-lens array may be manufactured as a fixed type by fabricating micro-lenses, which have optical parameters adapted to the locations of point lights distributed over the transparent backlight panel and to the direction of light projected by the point lights.

Also, the micro-lens array may be configured with multiple lenses, the thicknesses of which are controllable in real time. For example, the micro-lens array may be configured with micro-lenses using polymer materials.

Here, the multiple lenses may be individually controlled based on a control signal for each of multiple groups generated based on the multiple lenses.

The process of controlling each of the multiple lenses will be described in detail with reference to FIGS. 12 to 16.

Here, the micro-lens array performs at least one of a convergence function and a divergence function, thereby adjusting the degree of light concentration such that the first light has the same properties as natural light. That is, because the wearable display based on optical transparency according to an embodiment of the present invention visually provides both a virtual image and an external image input from the outside of the display at the same time, the two images must be provided so as to be naturally shown to the user's eyes. Accordingly, the first light inside the wearable display, which is to be output in order to project the virtual image, may be adjusted using the micro-lens array so as to have the same characteristics as natural light, which affects the projection of the external image onto a pupil of a user.

That is, because the micro-lens array is capable of controlling the degree of light concentration of the first light, the area onto which the first light is projected may be variably controlled by adjusting the sense of the relative distance from the multiple point lights to the image display panel.

Here, the micro-lens array performs at least one of a convergence function and a divergence function, whereby the degree of light concentration may be controlled so as to improve the transmissivity with which the second light penetrates through the image display panel and to improve the collection rate at which the second light reflected from a pupil of a user is collected.

Here, the image display panel may be formed of a light-transmissive material. For example, the image display panel may be configured with an LCD panel from which a backlight panel is eliminated, a transparent OLED panel, or the like.

Here, because the second light penetrating through the image display panel needs to be projected onto a pupil of the user whose eye gaze is to be tracked, the degree of light concentration may be adjusted using the micro-lens array in order to project as much second light as possible onto a pupil of the user.

Here, among the multiple lenses, a lens, the refractive index of which exceeds a user recognition level, may be deactivated.

For example, when a part of the micro-lens array is included in a user's field of view, because the projection of the image of the real world outside the wearable display may be distorted, the function of some lenses may be disabled in consideration of the refractive index.

Here, through selective masking, which defocuses the external image based on a change in the refractive index of the lens, the virtual image output via the image display panel may be made more clearly visible.

Also, in the method for providing a composite image based on optical transparency according to an embodiment of the present invention, the eye gaze of the user is tracked at step S230 by collecting the second light reflected from a pupil of the user based on the optical waveguide.

Here, using the bidirectional propagation characteristic of a medium forming the optical waveguide, while the second light is being output from the multiple point lights, the second light, reflected from a pupil of the user, may be collected.

For example, when the second light that travels along the optical waveguide is projected onto an eye of a user, the second light reflected therefrom may be collected using the point lights that project the second light or point lights exclusively used for collecting the reflected second light. Here, the eye-tracking module according to an embodiment of the present invention may determine the direction of eye gaze of the user in consideration of the amount of the reflected and collected second light and the pattern of the reflected second light, which is collected by the point lights.

Here, the reflected second light may be collected using the end part of the optical waveguide that is extended closer to the pupil of the user.

Here, in order to improve the efficiency of collection of the reflected second light, the function of lenses forming the micro-lens array may be controlled.

For example, the point lights for tracking the eye gaze of a user may be assumed to interfere with the user's field of view. In this case, the function of some lenses may be disabled such that the intensity of the second light projected by the point lights is somewhat reduced.

Also, in the method for providing a composite image based on optical transparency according to an embodiment of the present invention, the external image and the virtual image are combined based on the tracked eye gaze of the user and are provided to the user at step S240.

Here, the image display panel may be a module for creating and outputting a virtual image. For example, the image display panel may correspond to a spatial light modulator, and may be configured with a light-transmissive material.

Accordingly, the external image penetrating through the image display panel and the virtual image output via the image display panel may be simultaneously shown to the user.

Here, the external image and the virtual image are simultaneously shown using the wearable display, whereby the user may feel as if the two images were combined.

Here, the transparent backlight panel including the optical waveguide, the micro-lens array, and the image display panel may be included in the transparent panel of the wearable display, which is located directly in front of a pupil of the user.

Generally, in conventional methods for tacking a user's eye, a light source for eye tracking is located in a diagonal direction relative to a pupil of the user in the area outside the user's field of view in order to avoid obscuring the user's view, and a sensor for receiving eye information is also located outside the user's field of view. However, these conventional methods increase the volume and weight of a wearable device. Further, because the image of the eye acquired in the diagonal direction is distorted, the accuracy of eye tracking may be reduced.

In order to solve these problems, the present invention proposes a structure in which the image information of the pupil of a user is acquired using a transparent backlight panel placed directly in front of a pupil of the user, specifically, using the multiple point lights included in the transparent backlight panel. Accordingly, the volume and weight of the wearable display may be reduced, and the accuracy of eye tracking may be improved.

Here, the transparent panel may be in the form of a flat surface or a curved surface.

Here, the wearable display to which the transparent panel in the form of a flat or curved surface is applied will be described in detail with reference to FIGS. 18 and 19.

Also, in the method for providing a composite image based on optical transparency according to an embodiment of the present invention, the focus of a composite image projected onto a pupil of the user is calibrated using an additional micro-lens array located between the image display panel and the pupil of the user.

For example, the focus of the projected image may not be formed on a retina because of the characteristics of the eyesight of the user. Accordingly, in order to form the focus of the projected image on the retina, calibration may be performed using the additional micro-lens array.

Also, a point-light panel based on an optical waveguide, an energy concentration or distribution pattern based on an array of individually controllable micro-lenses, and an eye-tracking module using the above two modules may be implemented so as to operate independently, and may then be applied to the final implementation prototype.

For example, when the above three main modules are applied to a see-closed wearable display, it is possible to implement a Head-Mounted Display (HMD) that is thinner and lighter than a conventional display, such as Oculus VR's KD2 HMD and Sony's Morpheus HMD. Also, because the entire area of the optical waveguide point-light panel may be used as an input/output sensor unit for eye-tracking light, eye tracking may be more accurately implemented.

Also, in the method for providing a composite image based on optical transparency according to an embodiment of the present invention, various kinds of information generated during the above-described process of providing a composite image based on optical transparency is stored in a separate storage module.

Through the above-described method for providing a composite image, wearable display technology through which image information filling a user's field of view may be provided based on optical transparency using a light and small module resembling general eyeglasses may be provided.

Also, the method of controlling energy emission by each point light, which may overcome the limitation of the pin-light array, is provided, whereby the visual quality (contrast, color quality, intensity, focus alignment, and the like) of an image output via an eyeglasses-type display may be improved.

Also, an eye-tracking module with a minimum volume may be embedded in an eyeglasses-type display, and the pattern of movement of an eye located in front thereof or off to one side may be tracked.

FIGS. 3 to 6 are views that show an example of design of an optical waveguide based on multiple layers according to the present invention.

Referring to FIGS. 3 to 6, when an optical waveguide in a transparent backlight panel is designed in order to arrange a plurality of first point lights for emitting first light and a plurality of second point lights for emitting second light according to the present invention, the optical waveguide may be designed using multiple layers in order to individually control the point lights.

Figure 3:
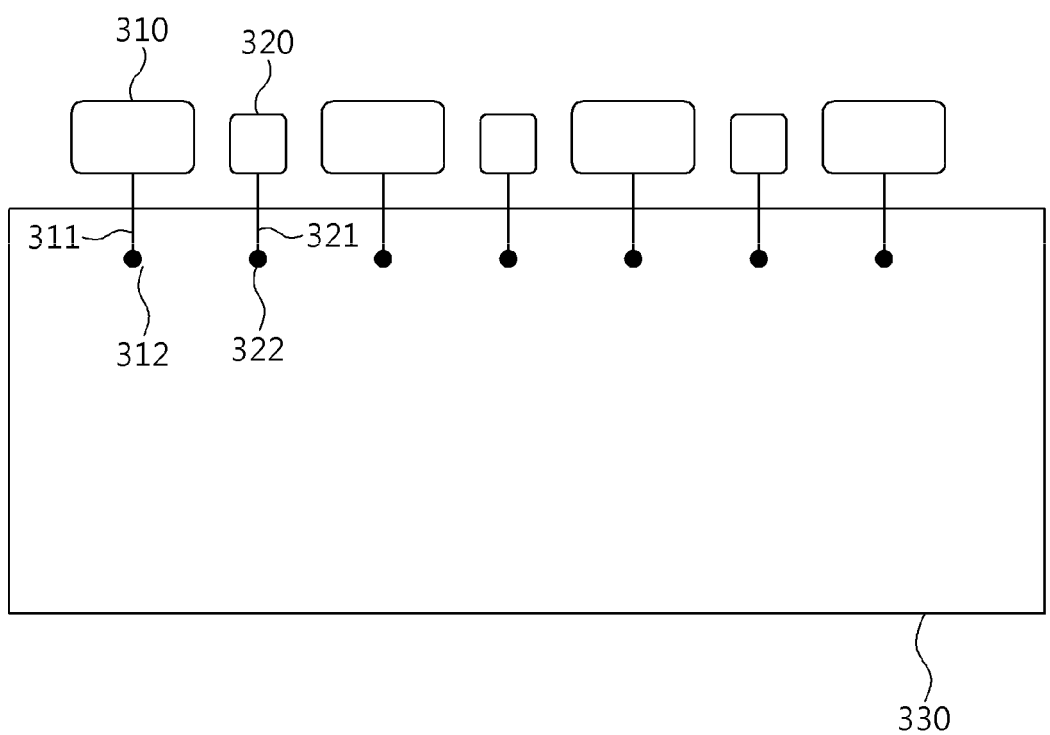
FIGS. 3 to 6 are views that show an example of design of an optical waveguide based on multiple layers according to the present invention.
Figure 4:
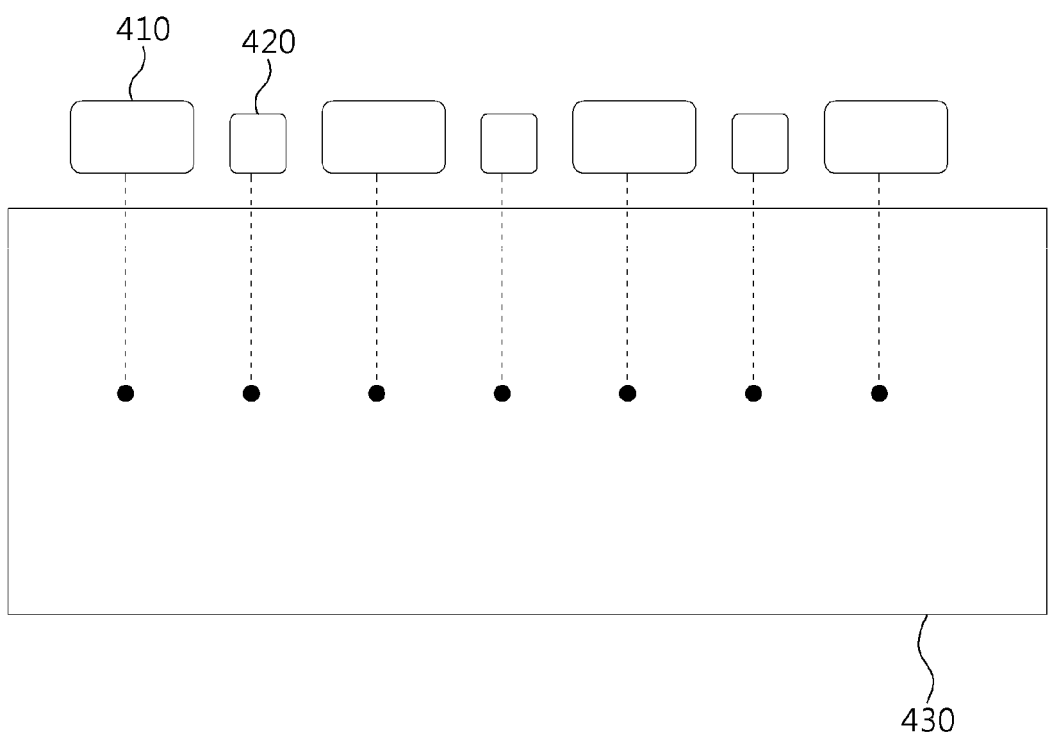
Figure 5:
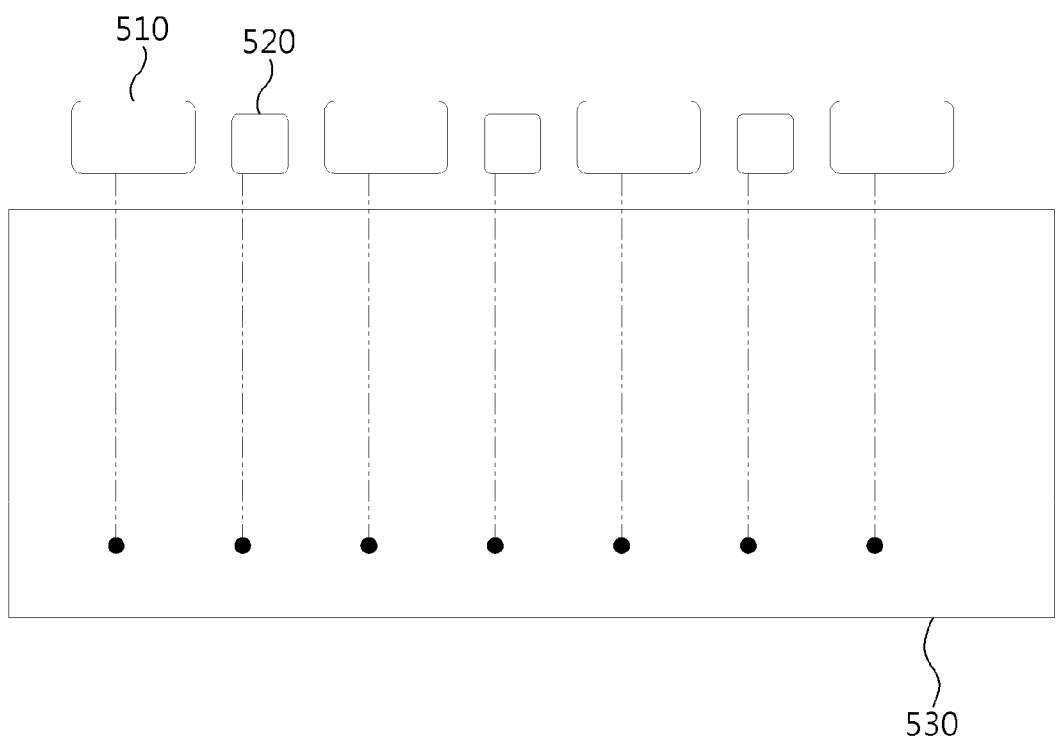
Figure 6:
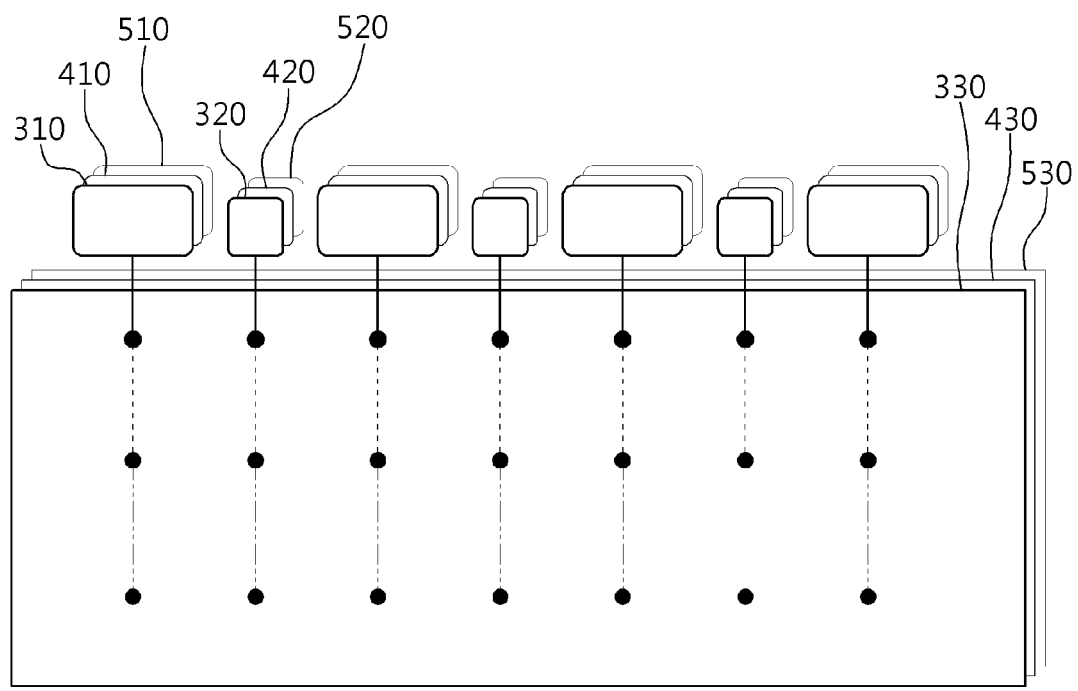

For example, the multiple-layer structure illustrated in FIG. 6 may be designed by layering the transparent backlight panel 330 shown in FIG. 3 and the transparent backlight panels 430 and 530 shown in FIGS. 4 and 5, which are of the same type as the transparent backlight panel 330. Here, the transparent backlight panel 330, illustrated in FIG. 3, includes a first optical waveguide 311 connected with a first light source 310, a first point light 312 connected with the first optical waveguide 311, a second optical waveguide 312 connected with a second light source 320, and a second point light 322 connected with the second optical waveguide 312, as illustrated in FIG. 3.

The multiple-layer structure may be advantageous in that the characteristics of light energy, such as intensity, wavelength, and the like, for each of all point lights may be individually controlled using each light source connected therewith. Also, when each optical waveguide is designed, the amount of light delivered to a single point light may be adjusted by changing the diameter of the optical waveguide.

Figure 7:
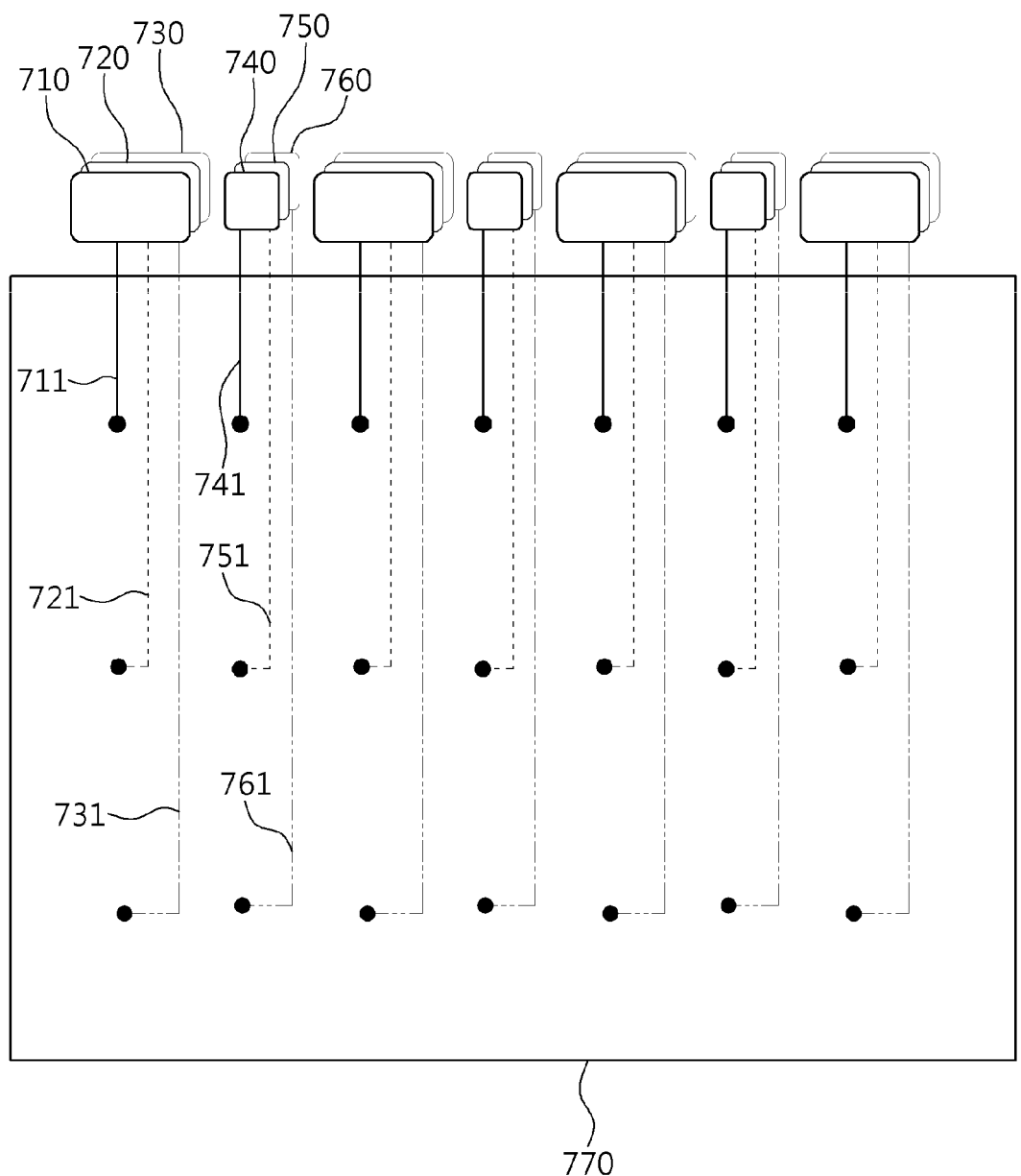
FIG. 7 is a view that shows an example of design of an optical waveguide based on a single layer according to the present invention.

FIG. 7 is a view that shows an example of design of an optical waveguide based on a single layer according to the present invention.

Referring to FIG. 7, the thickness or diameter of an optical waveguide formed inside a transparent backlight panel 770 according to the present invention may be a few micrometers (µm).

Accordingly, wire, such as a general electronic circuit, is not visible in the delivery path between a light source and a point light. Therefore, the problem in which light is blocked when an optically transparent system is implemented may not occur.

Also, because the transparent backlight panel in which an optical waveguides are formed is placed very close to the eye of a user, the image of optical waveguides in the form of lines is not focused on the retina, whereby transparency may be maintained.

Accordingly, a transparent backlight panel 770 may be implemented using only a single layer according to need, as shown in FIG. 7, without using the multiple-layer structure illustrated in FIG. 6.

FIGS. 8 to 11 are views that show an example of design of shared or distributed optical waveguides and an energy output method based thereon according to the present invention.

Figure 8:
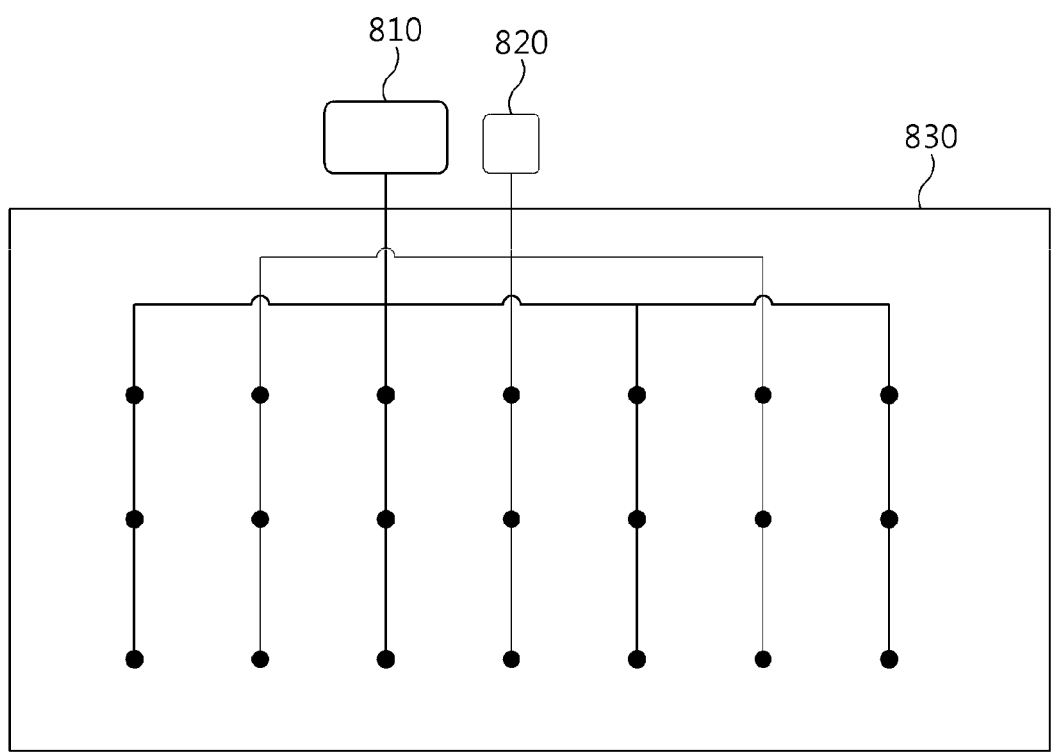
FIGS. 8 to 11 are views that show an example of design of shared or distributed optical waveguides and the method of outputting energy based thereon according to the present invention.
Figure 9:
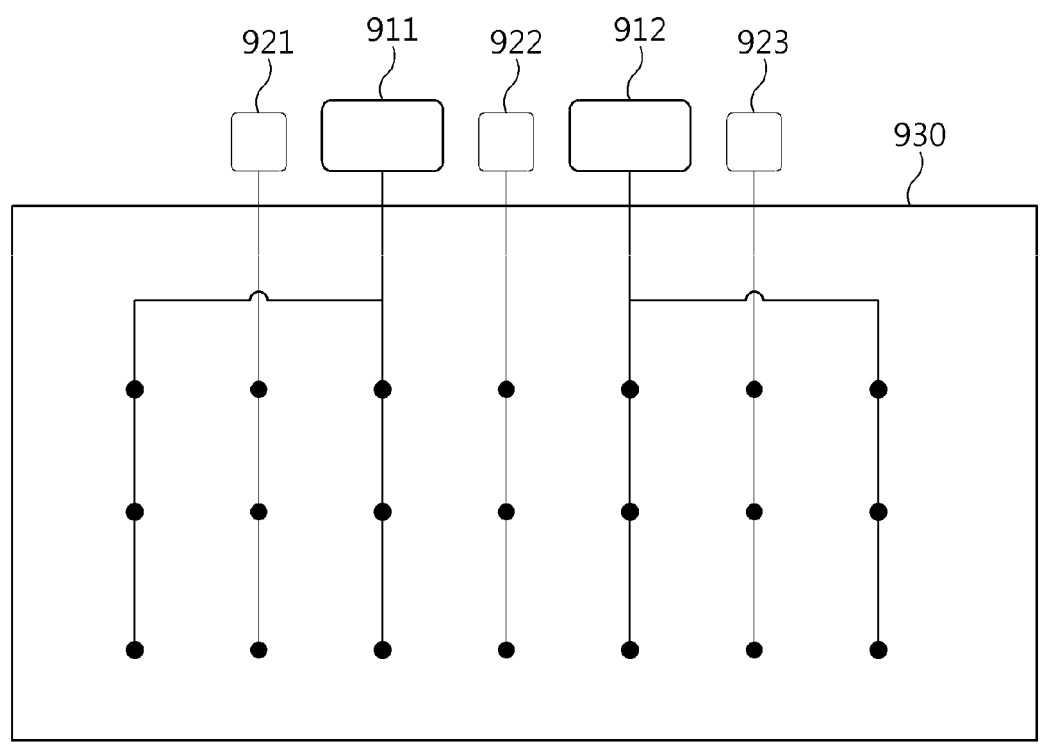

Referring to FIGS. 8 to 11, the optical waveguide according to the present invention may be designed such that all point lights are controlled using a single first light source 810 and a single second light source 820, as shown in FIG. 8, or such that all point lights are divided into a small number of groups and controlled based on multiple first light sources 911 and 912 and multiple second light sources 921, 922 and 923, as shown in FIG. 9.

First, the example in FIG. 8 shows that the single first light source supplies first light to all point lights connected therewith. Here, each of the first light source 810 and the second light source 820 corresponds to a single type of light, but light output to the multiple point lights may be imparted with same characteristics or different characteristics by changing the shapes of respective optical waveguides connected with the point lights. For example, the amount of light supplied to each of the point lights may be varied by changing the diameter of the optical waveguide connected therewith.

Also, the example in FIG. 9 shows that all of the point lights are divided into two or three groups and light is supplied thereto. Here, using the first light sources 911 and 912 or the second light sources 921, 922 and 923, which are connected with the respective groups of point lights, the light output by each group may be imparted with different characteristics.

Figure 10:
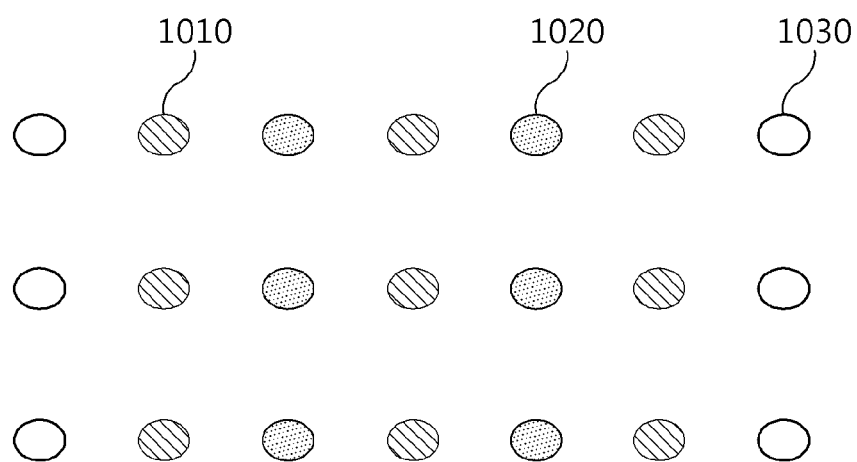

For example, the first light and the second light are supplied only to the first point lights 1010 and the second point lights 1020 placed in the center part, among all point lights, and some point lights 1030 placed at the border may be turned off by blocking the supply of light thereto, as shown in FIG. 10.

Figure 11:
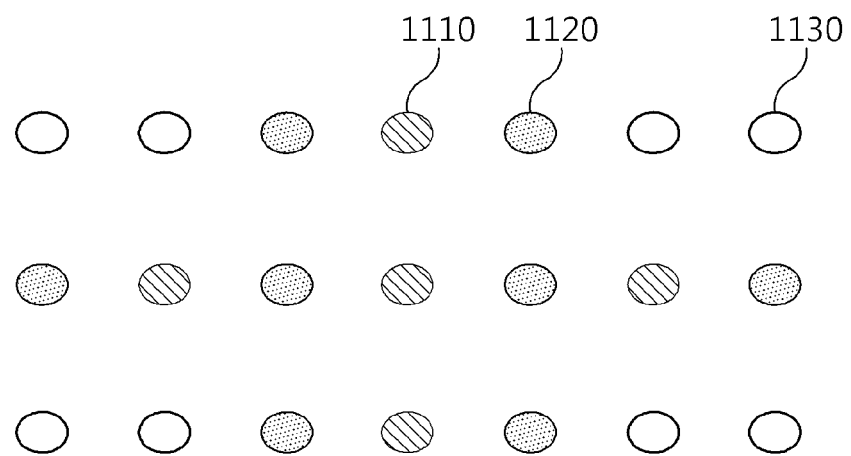

In another example, the first light and the second light may be supplied only to the first point lights 1110 and the second point lights 1120, which are centered horizontally and vertically, and the remaining point lights 1130 may be turned off by blocking the supply of light thereto, as shown in FIG. 11.

FIGS. 12 to 16 are views that show an example of the method of controlling multiple lenses in a micro-lens array according to the present invention.

Figure 12:
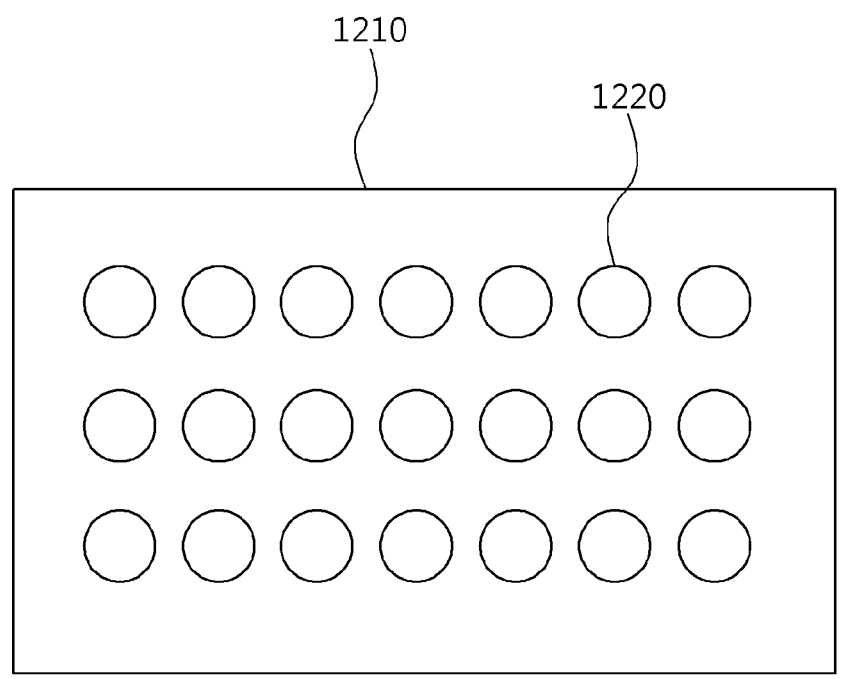
FIGS. 12 to 16 are views that show an example of the method of controlling multiple lenses in a micro-lens array according to the present invention.

Referring to FIGS. 12 to 16, multiple lenses 1220 included in the micro-lens array 1210 illustrated in FIG. 12 may be fixed-type lenses with previously designed optical parameters. Here, the optical parameters may have values optimized for specific eyesight, the optical waveguide, and the characteristics of an image display panel, and may be set so as to satisfy the purpose of the system.

Also, the multiple lenses 1220 according to an embodiment of the present invention may be deformable micro-lenses, the thicknesses of which may be controlled in real time.

Figure 13:
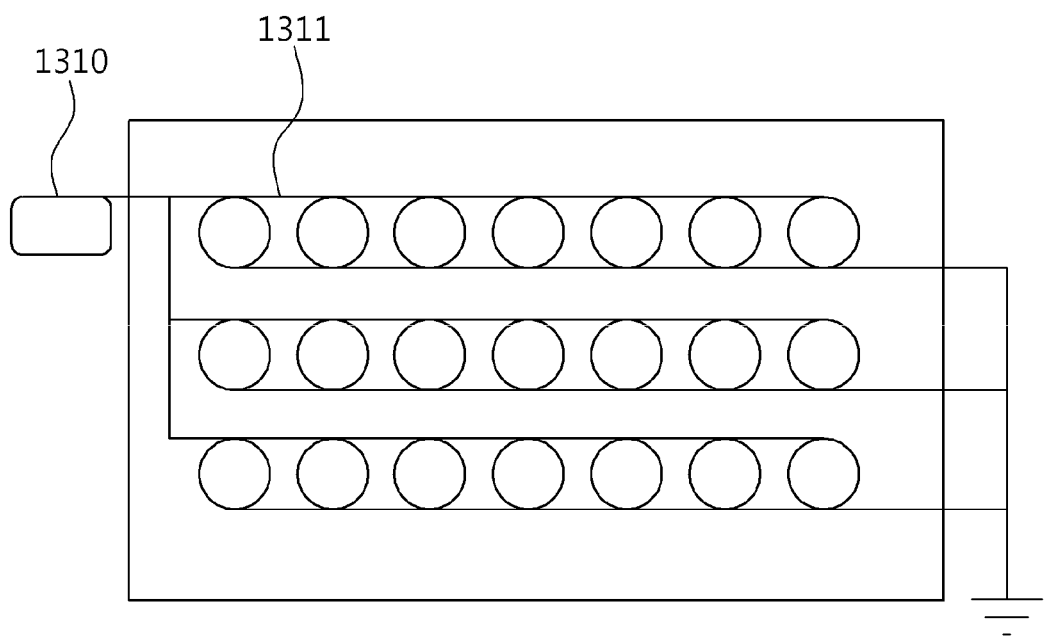

In this case, the multiple lenses 1220 may be controlled in such a way that all of the multiple lenses 1220 are connected with a transparent control circuit 1311 corresponding to a single lens control module, and all of the multiple lenses 1220 are transformed and controlled using a single control signal, as shown in FIG. 13.

Figure 14:
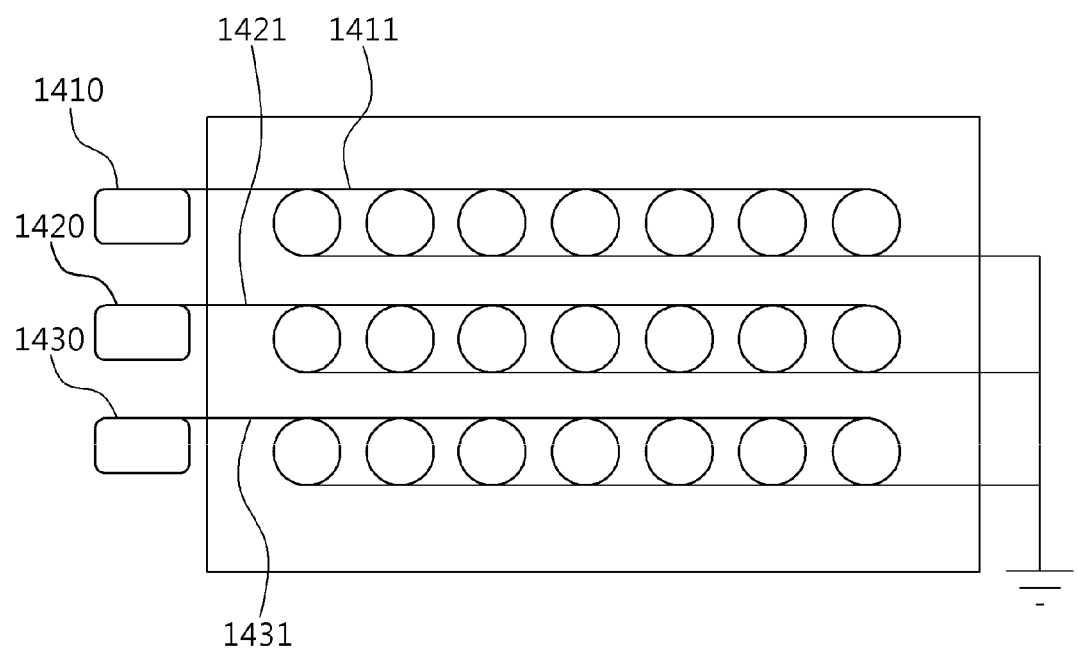

Alternatively, the multiple lenses 1220 may be divided into a certain number of groups, and the respective groups may be controlled by corresponding ones of multiple lens control modules 1410, 1420 and 1430, as shown in FIG. 14, whereby the multiple lenses 1220 may be controlled in greater variety of patterns.

Here, the transparent control circuits 1411, 1421 and 1431 for delivering control signals to the respective groups may be designed so as not to impede the travel of light.

Also, although not illustrated in the drawings, the multiple lenses 1220 may be controlled individually. Here, the transparent control circuit for delivering a control signal to each of the lenses may also be implemented so as not to impede the travel of light.

Also, the micro-lens array according to the present invention may use selective masking by changing the refractive index of each lens. For example, an external image projected from the outside may be shown via a transparent panel even in the area in which a virtual image is displayed in the image display panel, whereby the virtual image is superimposed on the external image. Accordingly, in order to clearly show the virtual image, the refractive index of the lens located in the corresponding part is controlled in order to defocus the external image projected onto the virtual image display area, whereby the external image may be concealed.

Figure 15:
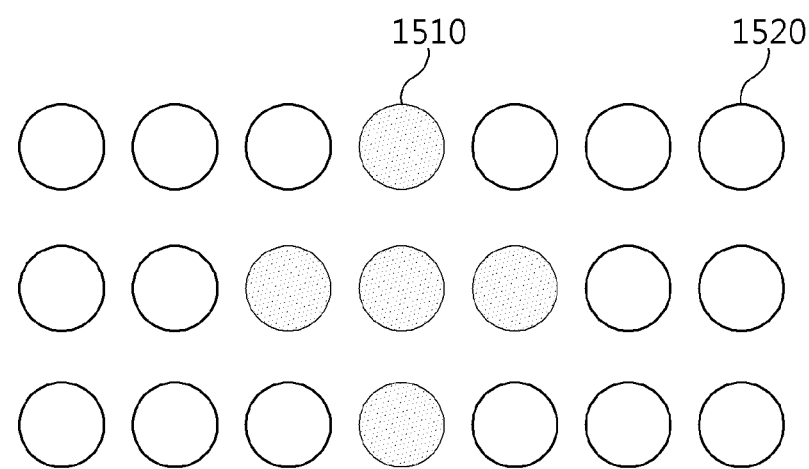
Figure 16:
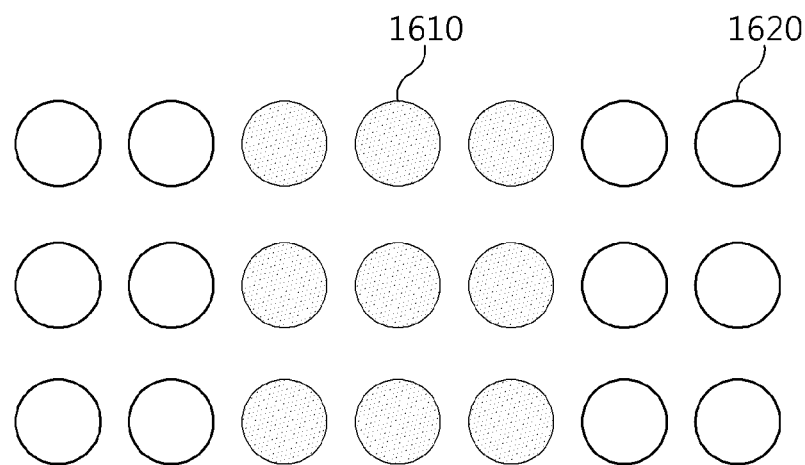

That is, as illustrated in FIGS. 15 to 16, lenses 1510 and 1610 located in the center part of the micro-lens array, in which the virtual image is expected to be displayed, are controlled so as to be in a masking state by changing the refractive index thereof, and the remaining lenses 1520 and 1620 may be controlled so as to allow the projection of the external image therethrough.

Figure 17:
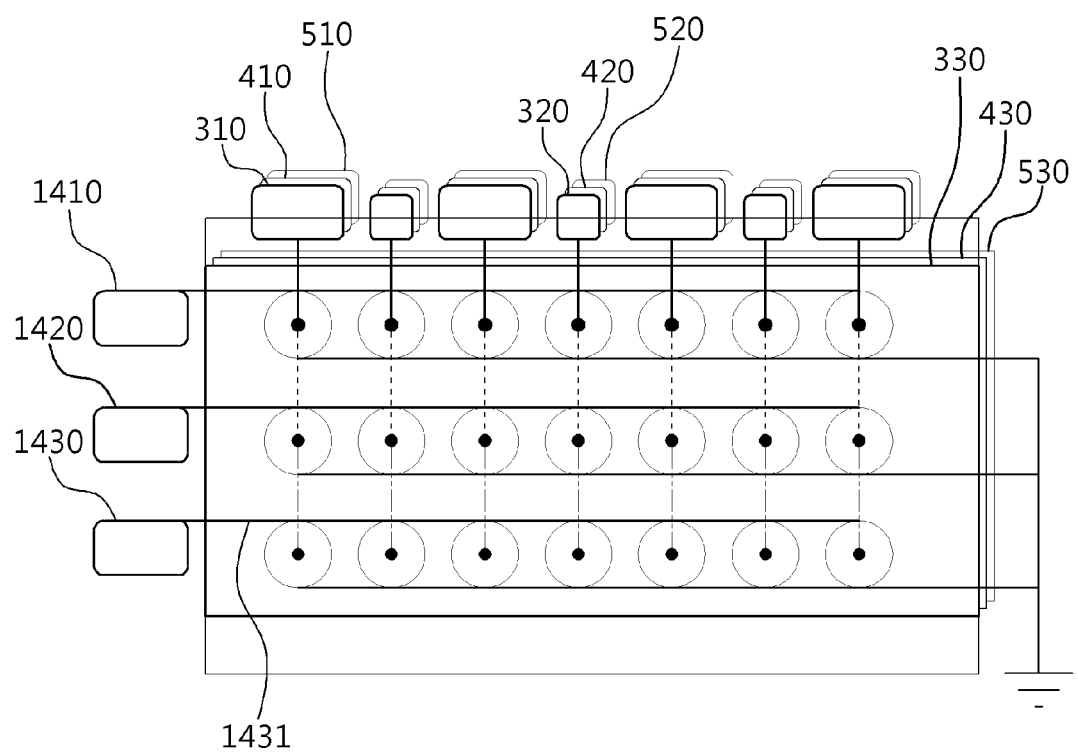
FIG. 17 is a view that shows an example in which the transparent backlight panel illustrated in FIG. 6 and the micro-lens array illustrated in FIG. 14 are layered.

FIG. 17 is a view that shows layering of the transparent backlight panel illustrated in FIG. 6 and the micro-lens array illustrated in FIG. 14.

Referring to FIG. 17, optical-waveguide-based transparent backlight panels 330, 430 and 530 and a micro-lens array are integrated into the transparent panel of a wearable display according to an embodiment of the present invention, whereby the transparent panel may be produced in the form of a single thin lens for eyeglasses.

Here, the transparent backlight panel or the micro-lens array illustrated in FIG. 17 may be produced in various forms depending on the purpose thereof. Accordingly, the wearable display according to the present invention may also be produced in various forms.

Figure 18:
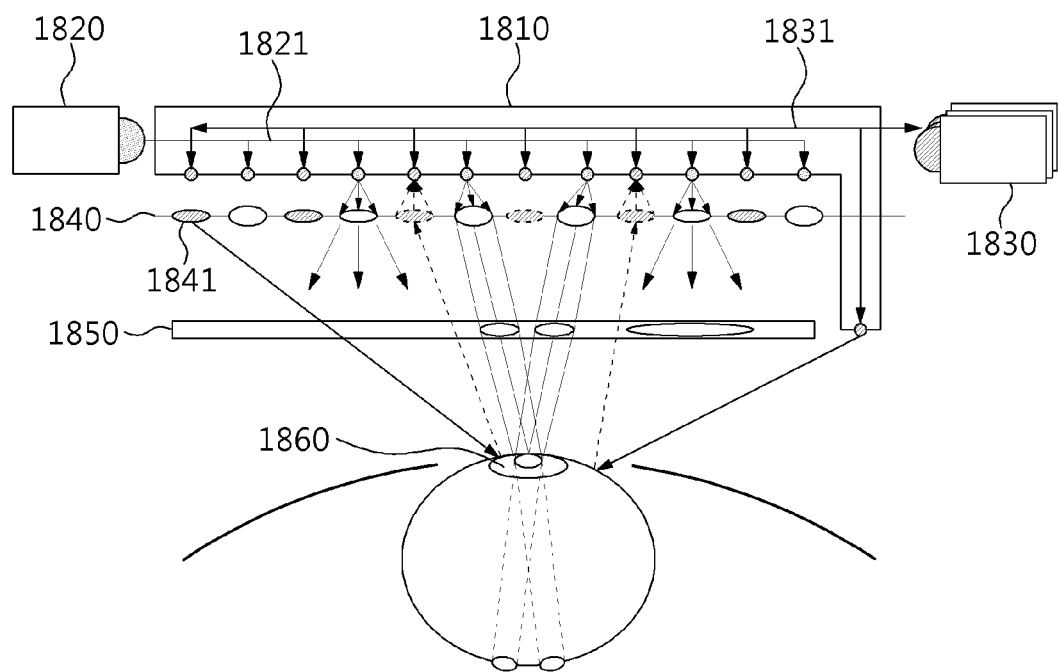
FIG. 18 is a view that shows the structure of a wearable display in the form of a flat surface according to an embodiment of the present invention.

FIG. 18 is a view that shows the structure of a wearable display in the form of a flat surface according to an embodiment of the present invention.

Referring to FIG. 18, a wearable display in the form of a flat surface includes a transparent backlight panel 1810, a micro-lens array 1840, eye-tracking modules 1810 and 1850, and an image display panel 1850.

The transparent backlight panel 1810 enables first light to be supplied from a first light source 1820 to multiple point lights through a first optical waveguide 1821 and enables second light to be supplied from a second light source 1830 to multiple point lights through a second optical waveguide 1831.

Here, although not illustrated in FIG. 18, the first light supplied by the first light source 1820 and the second light supplied by the second light source 1830 may share the same optical waveguide when supplied to multiple point lights. That is, the first optical waveguide and the second optical waveguide illustrated in FIG. 18 may be combined, and the first light and the second light may be supplied using the single combined waveguide.

Here, the first light supplied by the first light source 1820 is not randomly reflected, but travels only along the previously designed first optical waveguide 1821, whereby the problem in which light cannot maintain an equal brightness and wavelength by being totally internally reflected and scattered when the existing point-light source pattern is used may be solved.

For example, the optical waveguide may be designed and manufactured using the method of designing and manufacturing an Integrated Circuit (IC) board or a press-printing method for forming multiple layers. These manufacturing methods are commonly used in optical communications fields or semiconductor fabrication fields, but may also be used to solve the problems resulting from forming the pattern of point lights in the field of a wearable display that is capable of providing a composite image, as in the present invention.

Here, the first light supplied by the first light source 1820 may be visible rays for showing a virtual image generated in the wearable display to a user by projecting the same.

Here, the intensity of the first light supplied to each of multiple first point lights may be individually controlled by adjusting the diameters of some of the multiple paths corresponding to the first optical waveguide 1821.

For example, the first waveguide 1821 may be designed such that the first light is independently directed to all of the point lights connected with the first optical waveguide 1821 using multiple first light sources 1820.

Alternatively, the first optical waveguide 1821 may be designed such that, using a small number of first light sources 1820, the first light is directed to all of the point lights connected with the first optical waveguide 1821 through a branch method.

Accordingly, the transparent backlight panel 1810 of the wearable display may be advantageous in that point lights may be implemented such that light for all of the point lights has the same properties or in that the point lights may be implemented so as to have different patterns depending on the purpose. That is, the transparent backlight panel 1810 according to the present invention may be used as a panel for displaying an arbitrary video image when the concept of a unit pixel in a general image panel is applied thereto.

Here, the characteristics of the first light supplied to each of the multiple point lights may be individually controlled based on a multiple-layer structure using the multiple transparent backlight panels 1810.

Because the multiple-layer structure has been described with reference to FIGS. 3 to 6, a description thereof will be omitted in FIG. 18.

Here, the second optical waveguide 1831 may have the same characteristics as the above-described first optical waveguide 1821. That is, the second optical waveguide 1831 may differ from the first optical waveguide 1821 in that the first optical waveguide 1821 is used to supply the first light from the first light source 1820 whereas the second optical waveguide 1831 is used to supply the second light from the second light source 1830.

For example, the second light source 1830 may be used for tracking the eye gaze of the user who wears the wearable display, and may supply light having a wavelength that is harmless to the human body and available for eye tracking. That is, the second light may not be limited to light having a specific wavelength, such as infrared rays.

Here, the second light may be projected using point lights other than the point lights that project the first light, as shown in FIG. 18, or may be projected using the point lights that project the first light.

That is, a single point light may project both the first light and the second light, and a point light for projecting the first light may be separate from that for projecting the second light.

The micro-lens array 1840 adjusts the degree of light concentration of any one of the first light and the second light, thereby outputting light of which the degree of light concentration is adjusted.

Here, the micro-lens array 1840 may be manufactured as a fixed type by fabricating micro-lenses, which have optical parameters adapted to the locations of the multiple point lights distributed over the transparent backlight panel 1810 and to the direction of light projected by the multiple point lights.

Also, the micro-lens array 1840 may be configured with multiple lenses 1841, the thicknesses of which are controllable in real time. For example, the micro-lens array 1840 may be configured with micro-lenses using polymer materials.

Here, the multiple lenses 1841 may be individually controlled based on a control signal for each of multiple groups generated based on the multiple lenses 1841.

The process of controlling each of the multiple lenses 1841 has been described with reference to FIGS. 12 to 16, and thus a description thereof will be omitted in FIG. 18.

Here, the micro-lens array 1840 performs at least one of a convergence function and a divergence function, thereby adjusting the degree of light concentration such that the first light has the same properties as natural light. That is, because the wearable display based on optical transparency according to an embodiment of the present invention visually provides both a virtual image and an external image input from outside the display at the same time, the two images must be provided so as to be naturally shown to the user's eyes. Accordingly, using the micro-lens array 1840, the first light inside the wearable display, which is to be output in order to project the virtual image, may be adjusted so as to have the same characteristics as natural light, which affects the projection of the external image onto a pupil of a user.

That is, because the micro-lens array 1840 is capable of controlling the degree of light concentration of the first light output by the first light source 1820, the area onto which the first light is projected may be variably controlled by adjusting the sense of a relative distance from the multiple point lights for emitting the first light to the image display panel 1850.

The eye-tracking module tracks the eye gaze of a user by collecting the second light reflected from a pupil 1860 of the user based on the optical waveguide.

Here, although a specific eye-tracking module is not illustrated in FIG. 18, the function of an eye-tracking module may be performed based on the second light source 1830, the second optical waveguide 1831 included in the transparent backlight panel 1810, and the multiple point lights, illustrated in FIG. 18, whereby the line of sight from a pupil 1860 of the user may be tracked.

Here, the micro-lens array 1840 performs at least one of a convergence function and a divergence function, whereby the degree of light concentration may be controlled so as to improve the transmissivity with which the second light penetrates through the image display panel 1850 and to improve the collection rate at which the second light reflected from the pupil 1860 of a user is collected.

Here, the image display panel 1850 is a module for outputting the virtual image to be combined with the external image. The image display panel 1850 may be formed of a light-transmissive material. For example, the image display panel may be configured with an LCD panel from which a backlight panel is eliminated, a transparent OLED panel, or the like.

Here, because the second light penetrating through the image display panel 1850 needs to be projected onto a pupil 1860 of the user whose eye gaze is to be tracked, the degree of light concentration may be adjusted using the micro-lens array 1840 in order to project as much second light as possible onto the pupil 1860 of the user.

Here, using the bidirectional propagation characteristic of a medium forming the optical waveguide, while the second light is directed to the pupil 1860 of the user, the second light reflected therefrom may be collected.

For example, when the second light that travels along the second optical waveguide 1831 is projected onto the eye of a user, the second light reflected therefrom may be collected using the point lights that project the second light or point lights exclusively used for collecting the reflected second light. Here, the eye-tracking module according to an embodiment of the present invention may determine the direction of the eye gaze of the user in consideration of the amount and pattern of the reflected and collected second light.

Here, among the multiple lenses 1841, a lens, the refractive index of which exceeds a user recognition level, may be deactivated.

For example, when a part of the micro-lens array is included in the user's field of view, because the projection of the image of the real world outside the wearable display may be distorted, the functions of some lenses may be disabled in consideration of the refractive index.

Here, through selective masking, which defocuses the external image based on a change in the refractive index of the lens, the virtual image output via the image display panel 1850 may be made more clearly visible.

Here, the image display panel 1850 may be a module for creating and displaying a virtual image. For example, the image display panel 1850 may correspond to a spatial light modulator (SLM), and may be configured with a light-transmissive material.

Accordingly, the external image penetrating through the image display panel 1850 and the virtual image output via the image display panel 1850 may be simultaneously shown to the user.

Here, the external image and the virtual image are simultaneously shown using the wearable display, whereby the user may feel as if the two images were combined.

Here, the transparent backlight panel 1810 including at least one of the first optical waveguide 1821 and the second optical waveguide 1831, the micro-lens array 1840, and the image display panel 1850 may be included in the transparent panel of the wearable display, which is located directly in front of a pupil of the user.

Generally, in the conventional methods for tracking a user's eye, a light source for eye tracking is located in a diagonal direction relative to a pupil of the user in the area outside the user's field of view in order to avoid obscuring the user's view, and a sensor for receiving eye information is also located outside the user's field of view. However, these conventional methods increase the volume and weight of a wearable device. Further, because the image of the eye acquired in the diagonal direction is distorted, the accuracy of eye tracking may be reduced.

In order to solve these problems, the present invention proposes a structure in which the image information of a pupil 1860 of a user is acquired using a transparent backlight panel 1810 placed directly in front of the pupil of the user, specifically, using the multiple point lights included in the transparent backlight panel 1810, as shown in FIG. 18. Accordingly, the volume and weight of the wearable display may be reduced, and the accuracy of eye tracking may be improved.

Here, the transparent panel may be in the form of a flat surface, as shown in FIG. 18, or may be in the form of a curved surface.

Here, the eye gaze of the user is tracked by collecting the second light reflected from a pupil 1860 of the user based on the multiple point lights and the second optical waveguide 1831. However, when the multiple point lights generate interference in the user's field of view, the reflected second light may be collected using the end part of the second optical waveguide 1831, which extends closer to the pupil 1860 of the user than the multiple point lights.

Here, in order to improve the efficiency of collection of the reflected second light, the function of the lenses 1841 forming the micro-lens array 1840 may be controlled.

For example, it may be assumed that the point lights for tracking the eye gaze of a user, other than the point lights for projecting the first light, interfere with the user's field of view. In this case, the function of the lenses may be disabled in order to somewhat reduce the intensity of the second light emitted by the point lights for eye tracking.

Using the above-described wearable display based on optical transparency, provided is wearable display technology, through which image information filling a user's field of view may be provided based on optical transparency using a light and small module resembling general eyeglasses.

Also, the method of controlling energy emission by each point light, which may overcome the limitation of the pin-light array, is provided, whereby the visual quality (contrast, color quality, intensity, focus alignment, and the like) of an image output via an eyeglasses-type display may be improved.

Also, an eye-tracking module with a minimum volume may be embedded in an eyeglasses-type display, and the pattern of movement of an eye located in front thereof or off to one side may be tracked.

Figure 19:
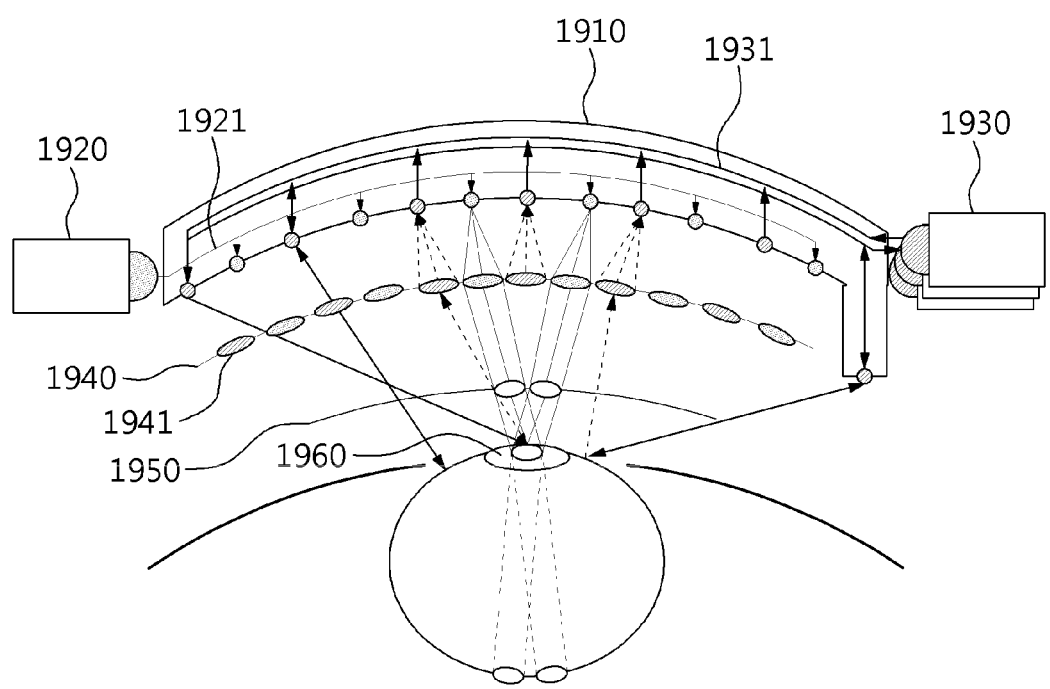
FIG. 19 is a view that shows the structure of a wearable display in the form of a curved surface according to an embodiment of the present invention.

FIG. 19 is a view that shows the structure of a wearable display having the form of a curved surface according to an embodiment of the present invention.

Referring to FIG. 19, the shape of the transparent panel of a wearable display according to an embodiment of the present invention is a curved surface, unlike the flat surface illustrated in FIG. 18.

Here, when the transparent backlight panel 1910 in the form of a curved surface, illustrated in FIG. 19, is used, the field of view, in which an external image or a virtual image is shown through the pupils 1960 of a user, may become wider.

That is, in the transparent backlight panel 1810 in the form of a flat surface, illustrated in FIG. 18, the distance from a pupil 1860 of a user to each of multiple point lights increases when moving from the center of the transparent backlight panel 1810 to the border thereof However, because the present invention may individually control light emission by the respective point lights by varying optical waveguides, even when the transparent backlight panel 1810 is implemented in the form of a flat surface, as shown in FIG. 18, the above problem may be solved by increasing the diameter of an optical waveguide closer to the border area of the transparent backlight panel 1810 or by adjusting the intensity of light using a light source.

When the transparent backlight panel 1910 is implemented in the form of a curved surface so as to be suitable for the curvature of an eyeball or a retina, as shown in FIG. 19, the distance from a pupil 1960 of a user to each of the multiple point lights included in the transparent backlight panel 1910 may be maintained the same.

The method of transmitting light energy proposed in the present invention may be widely applied to an optical system having an arbitrary 3D shape and volume when it is possible to design an optical waveguide inside the optical module. Also, because the wearable display based on optical transparency according to an embodiment of the present invention may enable an optical waveguide to be embedded in the curved (aspheric) surface in the form of an eyeglasses lens, it may be widely applied to an optical system having an arbitrary 3D shape and volume.

Figure 20:
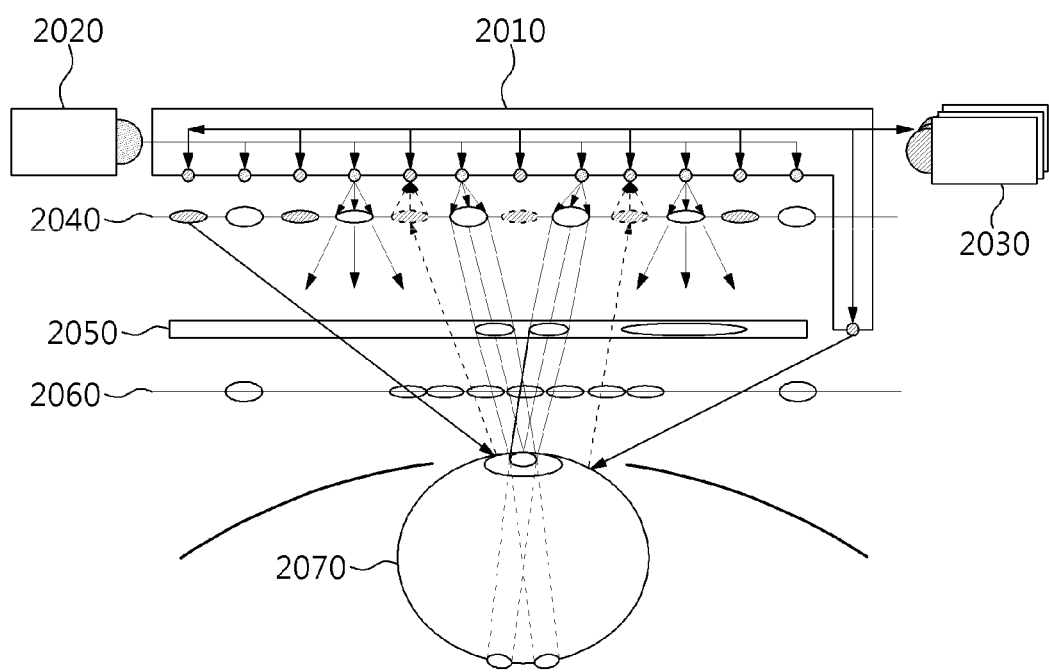
FIG. 20 is a view that shows the structure of a wearable display including an additional micro-lens array according to an embodiment of the present invention.

FIG. 20 is a view that shows the structure of a wearable display including an additional micro-lens array according to an embodiment of the present invention.

Referring to FIG. 20, an additional micro-lens array 2060 according to an embodiment of the present invention is placed between an image display panel 2050 and an eyeball 2070.

This structure may solve a problem in which the projected image is not focused on the retina due to the eyesight of a user.

According to the conventional art, the focus of the sight of a user is basically assumed to be infinitely distant (that is, the eye lens is assumed to be relaxed). However, when it is necessary to visualize and manipulate a 3D image in a near-body space within a distance of 1 m from a user's view point, like the manipulation of a 3D Graphical User Interface (GUI), the thickness of an eye lens is increased in order to see an item at a near distance, whereby the image projected onto the retina may be defocused.

Therefore, the present invention arranges the additional micro-lens array 2060 for calibration, as shown in FIG. 20, whereby the focal position may be calibrated.

According to the present invention, technology for a wearable display that is capable of providing image information filling a user's field of view based on optical transparency using a light and small module resembling general eyeglasses may be provided.

Also, the present invention may improve visual quality, such as contrast, color quality, intensity, focus alignment, and the like, of an image output via an eyeglasses-type display by providing technology for controlling energy emission by each point light source, which may overcome the limitation of a pin-light array.

Also, the present invention may provide an eye-tracking module with a minimum volume that may be embedded in an eyeglasses-type display and that may track the pattern of movement of eyes located in front thereof or off to one side.

As described above, the method for providing a composite image based on optical transparency according to the present invention and the apparatus for the same are not limitedly applied to the configurations and operations of the above-described embodiments, but all or some of the embodiments may be selectively combined and configured, so that the embodiments may be modified in various ways.

What is claimed is:

1. A method for providing a composite image based on optical transparency, comprising:
   supplying first light of a first light source for projecting a virtual image and second light of a second light source for tracking an eye gaze of a user to multiple point lights based on an optical waveguide having a bidirectional propagation characteristic, the multiple point lights projecting the first light and the second light;
   adjusting a degree of light concentration of any one of the first light and the second light projected by the multiple point lights, using a micro-lens array and outputting the first light or the second light, of which the degree of light concentration is adjusted;
   collecting the second light reflected from a pupil of the user based on the optical waveguide, thereby tracking the eye gaze of the user; and
   combining an external image with the virtual image based on the tracked eye gaze and providing the combined image to the user,
   wherein a transparent backlight panel including the optical waveguide, the micro-lens array, and a transparent image display panel for displaying the virtual image are included in a transparent panel of a wearable display, which is located directly in front of the pupil of the user.

2. The method of claim 1, wherein supplying the first light and the second light comprises individually controlling an intensity of the first light supplied to each of the multiple point lights by adjusting diameters of some of multiple paths corresponding to the optical waveguide.

3. The method of claim 2, wherein supplying the first light and the second light comprises individually controlling a characteristic of the first light supplied to each of the multiple point lights based on a multiple-layer structure using multiple transparent backlight panels.

4. The method of claim 1, wherein the micro-lens array is configured with multiple lenses, thicknesses of which are controllable in real time.

5. The method of claim 4, wherein the multiple lenses are individually controlled in response to a control signal for each of multiple groups generated based on the multiple lenses.

6. The method of claim 1, further comprising:
calibrating a focus of a composite image projected onto the pupil of the user using an additional micro-lens array located between the image display panel and the pupil of the user.

7. The method of claim 1, wherein the transparent panel of the wearable display is in a form of a flat surface or a curved surface.

8. The method of claim 1, wherein outputting the first light or the second light, of which the degree of light concentration is adjusted, comprises:
performing, by the micro-lens array, at least one of a convergence function and a divergence function, thereby adjusting the degree of light concentration such that the first light has a same property as natural light; and
performing, by the micro-lens array, at least one of the convergence function and the divergence function, thereby adjusting the degree of light concentration such that a transmissivity with which the second light penetrates through the image display panel is increased and such that a collection rate at which the second light reflected from the pupil of the user is collected is increased.

9. The method of claim 4, wherein outputting the first light or the second light, of which the degree of light concentration is adjusted, comprises:
deactivating a lens, a refractive index of which exceeds a user recognition level, among the multiple lenses.

10. The method of claim 1, wherein tracking the eye gaze of the user comprises collecting the reflected second light using an end part of the optical waveguide that is extended so as to be closer to the pupil of the user.

11. A wearable display based on optical transparency, comprising:
a transparent backlight panel for supplying first light of a first light source for projecting a virtual image, which is to be combined with an external image, and second light of a second light source for tracking an eye gaze of a user to multiple point lights based on an optical waveguide having a bidirectional propagation characteristic, the multiple point lights projecting the first light and the second light;
a micro-lens array for adjusting a degree of light concentration of any one of the first light and the second light projected by the multiple point lights and outputting the first light or the second light, of which the degree of light concentration is adjusted;
an eye-tracking module for tracking the eye gaze of the user by collecting the second light reflected from a pupil of the user based on the optical waveguide; and
an image display panel for displaying the virtual image, wherein the transparent backlight panel, the micro-lens array, and the image display panel are included in a transparent panel of the wearable display that is located directly in front of the pupil of the user.

12. The wearable display of claim 11, wherein the transparent backlight panel individually controls an intensity of the first light supplied to each of the multiple point lights by adjusting diameters of some of multiple paths corresponding to the optical waveguide.

13. The wearable display of claim 12, wherein a characteristic of the first light supplied to each of the multiple point lights is individually controlled based on a multiple-layer structure using multiple transparent backlight panels.

14. The wearable display of claim 11, wherein the micro-lens array is configured with multiple lenses, thicknesses of which are controllable in real time.

15. The wearable display of claim 14, wherein the multiple lenses are individually controlled in response to a control signal for each of multiple groups generated based on the multiple lenses.

16. The wearable display of claim 11, wherein the transparent panel of the wearable display further includes an additional micro-lens array, located between the image display panel and the pupil of the user, for calibrating a focus of a composite image to be projected onto the pupil of the user.

17. The wearable display of claim 11, wherein the transparent panel of the wearable display is in a form of a flat surface or a curved surface.

18. The wearable display of claim 11, wherein the eye-tracking module collects the reflected second light using an end part of the optical waveguide extended so as to be closer to the pupil of the user.

19. A method for providing a composite image based on optical transparency, comprising:
supplying first light of a first light source for projecting a virtual image and second light of a second light source for tracking an eye gaze of a user to multiple point lights based on an optical waveguide having a bidirectional propagation characteristic, the multiple point lights projecting the first light and the second light;
adjusting a degree of light concentration of any one of the first light and the second light projected by the multiple point lights, using a micro-lens array and outputting the first light or the second light, of which the degree of light concentration is adjusted;
collecting the second light reflected from a pupil of the user based on the optical waveguide, thereby tracking the eye gaze of the user; and
combining an external image with the virtual image based on the tracked eye gaze and providing the combined image to the user,
wherein the micro-lens array is configured with multiple lenses, and the multiple lenses are individually controlled in response to a control signal for each of multiple groups generated based on the multiple lenses.

20. A method for providing a composite image based on optical transparency, comprising:
supplying first light of a first light source for projecting a virtual image and second light of a second light source for tracking an eye gaze of a user to multiple point lights based on an optical waveguide having a bidirectional propagation characteristic, the multiple point lights projecting the first light and the second light;
adjusting a degree of light concentration of any one of the first light and the second light projected by the multiple point lights, using a micro-lens array and outputting the first light or the second light, of which the degree of light concentration is adjusted;
collecting the second light reflected from a pupil of the user based on the optical waveguide, thereby tracking the eye gaze of the user; and
combining an external image with the virtual image based on the tracked eye gaze and providing the combined image to the user,
wherein the micro-lens array is configured with multiple lenses, and
wherein outputting the first light or the second light, of which the degree of light concentration is adjusted, comprises deactivating a lens, a refractive index of which exceeds a user recognition level, among the multiple lenses.

* * * * *